(12) United States Patent
Matthews et al.

(10) Patent No.: US 11,060,883 B2
(45) Date of Patent: Jul. 13, 2021

(54) SYSTEM AND METHOD FOR DETERMINING THE ENERGY REQUIREMENT OF A VEHICLE FOR A JOURNEY

(71) Applicant: Spark EV Technology Ltd., Newmarket (GB)

(72) Inventors: Gregory James Matthews, Mepal (GB); Justin Bradley Ott, Chrishall (GB)

(73) Assignee: Spark EV Technology Ltd., Kennett (GB)

(*) Notice: Subject to any disclaimer, the term of this patent is extended or adjusted under 35 U.S.C. 154(b) by 328 days.

(21) Appl. No.: 15/850,040

(22) Filed: Dec. 21, 2017

(65) Prior Publication Data

US 2019/0195650 A1 Jun. 27, 2019

(51) Int. Cl.
*G01C 21/36* (2006.01)
*B60W 40/12* (2012.01)
*G01C 21/34* (2006.01)

(52) U.S. Cl.
CPC ......... *G01C 21/3697* (2013.01); *B60W 40/12* (2013.01); *G01C 21/3446* (2013.01); *G01C 21/3469* (2013.01); *B60W 2530/209* (2020.02)

(58) Field of Classification Search
CPC ............ G01C 21/3469; G01C 21/3697; B60L 2260/54; B60L 2260/52; B60L 11/1861; B60L 11/1862; B60L 2240/12
See application file for complete search history.

(56) References Cited

U.S. PATENT DOCUMENTS

| 9,121,722 | B1* | 9/2015 | Yu ..................... G01C 21/3469 |
| 2013/0179062 | A1* | 7/2013 | Yasushi .................. G06F 17/00 |
| | | | 701/123 |
| 2014/0207363 | A1 | 7/2014 | Kanno et al. |
| 2014/0278038 | A1 | 9/2014 | Stankoulov |
| 2014/0324328 | A1* | 10/2014 | Granato ................ B60W 20/12 |
| | | | 701/123 |

(Continued)

FOREIGN PATENT DOCUMENTS

JP 5599509 7/2014

OTHER PUBLICATIONS

Combined Search and Examination Report Under Sections 17 & 18(3) for Application No. GB1721535.1 dated Jun. 18, 2018.

*Primary Examiner* — Redhwan K Mawari
(74) *Attorney, Agent, or Firm* — Fleit Intellectual Property Law; Jose Gutman (57) ABSTRACT

A system for determining an energy requirement of a vehicle for a journey. The system includes a predictor mechanism to predict, using an energy prediction algorithm, a vehicle energy requirement for the journey. The system includes an updater mechanism configured to refine the energy prediction algorithm for the vehicle by determining for each of a number of historical journeys undertaken by the vehicle, an error between an actual vehicle energy usage for the historical journey and a predicted energy usage derived using the energy prediction algorithm for the historical journey, each historical journey of the of the number of historical journeys being associated with a respective error of a set of errors. An aggregate error is calculated from the set of errors. The updater is arranged to adjust the energy prediction algorithm to reduce the aggregate error.

8 Claims, 3 Drawing Sheets

(56) References Cited

U.S. PATENT DOCUMENTS

| | | | |
|---|---|---|---|
| 2015/0134174 A1* | 5/2015 | Preece | H01M 10/48 |
| | | | 701/22 |
| 2015/0241310 A1* | 8/2015 | Brown | G01R 31/3648 |
| | | | 702/179 |
| 2016/0123752 A1* | 5/2016 | Kandula | G01C 21/3469 |
| | | | 701/123 |
| 2016/0153796 A1* | 6/2016 | Stankoulov | B60W 40/1005 |
| | | | 701/123 |
| 2017/0030728 A1* | 2/2017 | Baglino | G01C 21/3469 |
| 2019/0195650 A1* | 6/2019 | Matthews | G01C 21/3446 |
| 2019/0241192 A1* | 8/2019 | Matthews | B60W 40/076 |
| 2019/0265057 A1* | 8/2019 | Baglino | G01C 21/3469 |

\* cited by examiner

SYSTEM AND METHOD FOR DETERMINING THE ENERGY REQUIREMENT OF A VEHICLE FOR A JOURNEY

FIELD OF THE INVENTION

The invention relates to a system and method for determining the energy requirement of a vehicle for a journey, the invention is particularly applicable, though does not exclusively relate, to electric vehicles. The system and method may be used as part of a vehicle scheduling system.

BACKGROUND TO THE INVENTION

Existing vehicle range prediction systems function by extrapolating recent consumption data of the vehicle, e.g. over the last 15 minutes, to provide an indication of the remaining range of the vehicle before refueling or recharging. They do not take into account the full nature of the journey to be undertaken by the vehicle and as a consequence the ranges returned are often inaccurate. This is particularly problematic for vehicles which have a long refueling/recharging interval or where refueling/recharging stations are sparse.

The present invention was developed to ameliorate the above problems.

SUMMARY OF THE INVENTION

In a first aspect there is provided system for determining an energy requirement of a vehicle for a journey, the system adapted to: obtain journey data relating to the journey; obtain vehicle data associated with the vehicle; and obtain non-vehicle data; the system comprising a predictor mechanism to predict, using an energy prediction algorithm, a vehicle energy requirement for the journey from the journey data, vehicle data and non-vehicle data; the system comprising an updater mechanism configured to adjust the energy prediction algorithm for the vehicle by: determining for each of a number of historical journeys undertaken by the vehicle, an error between an actual vehicle energy usage for the historical journey and a predicted energy usage derived using the energy prediction algorithm for the historical journey from historical journey data, historical vehicle data and historical non-vehicle data, each historical journey of the of the number of historical journeys being associated with a respective error of a set of errors; determining an aggregate error from the set of errors; and adjusting the energy prediction algorithm to reduce the aggregate error.

In a second aspect there is provided a computer implemented method for determining energy requirement of a vehicle for a journey, the method comprising: obtaining journey data; obtaining vehicle data associated with the vehicle; obtaining non-vehicle data; predicting using a predictor mechanism with an energy prediction algorithm, a vehicle energy requirement for the journey from the journey data, vehicle data and non-vehicle data; adjusting the energy prediction algorithm for the vehicle by: determining for each of a number of historical journeys undertaken by the vehicle, an error between an actual vehicle energy usage for the historical journey and a predicted energy usage derived using the energy prediction algorithm for the historical journey from historical journey data, historical vehicle data and historical non-vehicle data, each historical journey of the of the number of historical journeys being associated with a respective error of a set of errors; determining an aggregate error from the set of errors; and adjusting the energy prediction algorithm to reduce the aggregate error. The method may include updating the energy prediction algorithm with the adjusted energy prediction algorithm.

By adjusting the energy prediction algorithm to minimise the aggregate error for historical journeys, the algorithm more accurately predicts the energy requirement for future journeys undertaken by a specific vehicle and driver combination.

In this application the term 'driver' is taken to include an electronic system used to drive an autonomous vehicle as well as, more conventionally, a human.

The following features apply to both aspects of the invention.

Where the vehicle's energy store is a chemical energy store, such as for example, a hydrogen cell or gasoline tank, the energy on board data may comprise an indication of the fuel level and/or pressure. Where the energy store includes one or more batteries, capacitor or the like, the energy on board data may include an indication of the state of charge.

The system may be arranged to retrieve vehicle data from the vehicle. Vehicle data may comprise variant vehicle data, that being data expected to change over time, such as on an inter journey or intra-journey basis, and invariant vehicle data which is expected to remain substantially static. Variant vehicle data may be retrieved repeatedly from the vehicle, e.g. at least every 60 seconds, whilst the vehicle is in operation. This ensures the predictor mechanism can use relatively accurate data of the vehicle's condition to determine a prediction. It also means that the location of the vehicle can be known to a reasonable accuracy so that that the system can determine when the vehicle has finished a journey.

Examples of variant vehicle data include one or more of: location of the vehicle (e.g. provided through a global navigation system), state of health of the energy storage system (e.g. degradation of maximum storage capacity over time), vehicle system temperature(s) (e.g. the temperature of the energy store), and tyre pressures. This data may be obtained from the vehicle's computer.

The system may include a vehicle device (e.g. a computing device) arranged to receive the vehicle data from the vehicle (e.g. via one or more sensors) and transmit the received vehicle data, typically wirelessly, for receipt by the predictor mechanism. In one arrangement the vehicle device is connected to a computer of the vehicle, the vehicle's computer being connected to vehicle sensors. In a variant embodiment, the vehicle device comprises the vehicle's computer arranged to directly transmit the vehicle data. Vehicle data may be received by a prediction system that includes the predictor mechanism and updater mechanism.

Invariant vehicle data may include one or more of: vehicle dimensions; kerb weight; drag coefficients of the vehicle's chassis; auxiliary loads (e.g. headlamp consumption, interior heating system consumption) and type of tyres fitted. As this information is not expected to change on a per journey basis, it will not typically be obtained directly from the vehicle but rather from other sources such as vehicle specifications published by the manufacturer and user input. Invariant vehicle data may be obtained when the vehicle is added to the system or in the first instance that a vehicle of the same make is added to the system.

The system may be arranged to determine the energy requirement for multiple vehicles in which case the system may obtain vehicle data from each vehicle for which journey predictions are made. The system may be arranged to hold a separate energy prediction algorithm for each vehicle. The system may be arranged to update each energy prediction algorithm based on the historical journeys carried out by the vehicle to which it is associated. As such each energy prediction algorithm will, over time, be tuned to reflect the differences in actual energy usage by its associated vehicle as a consequence of different characteristics, aging and its driver's driving style.

Both variant and invariant vehicle data may be used to predict the vehicle's energy requirement for a journey.

Journey data may comprise geographical information (e.g. geographical coordinates) e.g. of start and end points of the journey, waypoint and/or other routing information. It may also include further information such as one or more of: payload (e.g. number of passengers), route restrictions (e.g. avoid tolls) and speed restrictions imposed on the vehicle (e.g. through the presence of an on-board speed restrictor).

The system may be arranged to receive a request for a prediction for an energy requirement for a journey from a journey request device, for example, a user via a computer, phone; a satellite navigation system or a vehicle scheduling system. The request may include the journey data.

Non-vehicle data may include one or more of: local weather (i.e. as applicable to the journey) e.g. wind speed, precipitation, temperature, air pressure, visibility, humidity and cloud cover); topography of the route; route distance; traffic information (e.g. average vehicle speeds at one or more sections along the route; stopping and turning information—e.g. number of stops and turns; road surface—type thereof and/or condition; and sunset/sunrise times. Non-vehicle data may be retrieved, at least in part, from one or more third party providers, e.g. metrological organisations and traffic information services. Non-vehicle data may be received, at least in part, via the internet. The system may use the journey data to obtain the relevant non-vehicle data for the journey.

The system may be adapted to retrieve energy on board data from the vehicle. The energy on board data may be used to derive the actual vehicle energy usage for the historical journey.

The actual vehicle energy usage may be derived using energy on board data retrieved from the vehicle at the beginning and end of the historical journey. The system may determine that a journey has ended using geographical information retrieved from the vehicle and/or by the user indicating the journey has ended.

The system may be adapted to use the energy on board data and a prediction of the vehicle energy required for a journey from the predictor mechanism to provide an output indicating if the journey is possible with the current energy on board the vehicle.

The system may be adapted to use the energy on board data and a prediction of the vehicle energy required for a journey from the predictor mechanism to provide an indication of the remaining power on board the vehicle that can be expected at the end of the journey The system may be arranged to store in a memory store, as historical data, one or more of the journey data; vehicle data; non-vehicle data; or data derived from one more of journey data, vehicle data and non-vehicle data; used and/or derived by the predictor mechanism to determine a prediction for a journey. The stored historical data may be used by the updater mechanism to determine a prediction for that journey as a historical journey. The memory store may also hold the energy prediction algorithm used by the predictor mechanism to predict the energy requirement for the journey.

Predicting an energy requirement for a vehicle for a journey may comprise determining multiple factors for the journey, each factor derived from one or more of the vehicle data, non-vehicle data and journey data; applying a weighting for each factor; and combining the weighted factors to derive the overall energy requirement.

The factors may include one or more of: journey distance, height of assent, height of decent, one or more speeds along the route of the journey; expected frequency of stops/starts; payload; location of re-fueling station; auxiliary loads; drag and impact of energy recovery system.

The journey distance factor may, for example, be derived from journey data, e.g. start and end point locations, and non-vehicle data, e.g. mapping data. An auxiliary load factor, for example, may be derived using invariant vehicle data, e.g. wattage of headlamps and heater and non-vehicle data, e.g. outside temperature, visibility and sunset/sunrise time.

The above factors relate to concrete attributes associated with calculation of kinetic energy, potential energy, drag energy etc. Alternatively or in addition, abstract factors each derived from a different combination one or more of the vehicle data, journey data and non-vehicle data but having no direct relation to real world measurements of energy, may be used instead.

The system may learn the specific individual contributions of each factor to the overall energy consumption for the vehicle and driver for a journey to make better predictions.

In an implementation of this, the system may be arranged to update the energy prediction algorithm by adjusting the weightings for the factors to minimise the aggregate error.

For each historical journey the updater may be arranged to derive a predicted energy usage using the energy prediction algorithm by: retrieving and/or determining values for multiple factors for the historical journey, the factors being derived from one or more of: journey data associated with the historical journey, vehicle data associated with the historical journey and non-vehicle data associated with the historical journey; applying a weighting to each factor; and combining the weighted factors;

and in which the updater is further arranged to apply an adjustment to a weighting for one of the factors to reduce the aggregate error, the adjustment being applied to the corresponding factor for each of the historical journeys.

The system may include a prediction system that includes the functions of the predictor mechanism and updater mechanism. The prediction mechanism may be connected to a network to receive or more of the vehicle information, non-vehicle information and journey requests via the network.

The functions of the predictor mechanism and updater mechanism may be implemented by suitably programmed circuitry including one or more processors and memory using techniques known to those skilled the art.

In another aspect, the method may be embedded in a computer program product embodied in one or more non-transitory computer readable medium(s), which comprise all the features enabling the implementation of the methods,

BRIEF DESCRIPTION OF THE DRAWINGS

The invention will now be described by way of example with reference to the drawings, as follows.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected", although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

Figure 1:
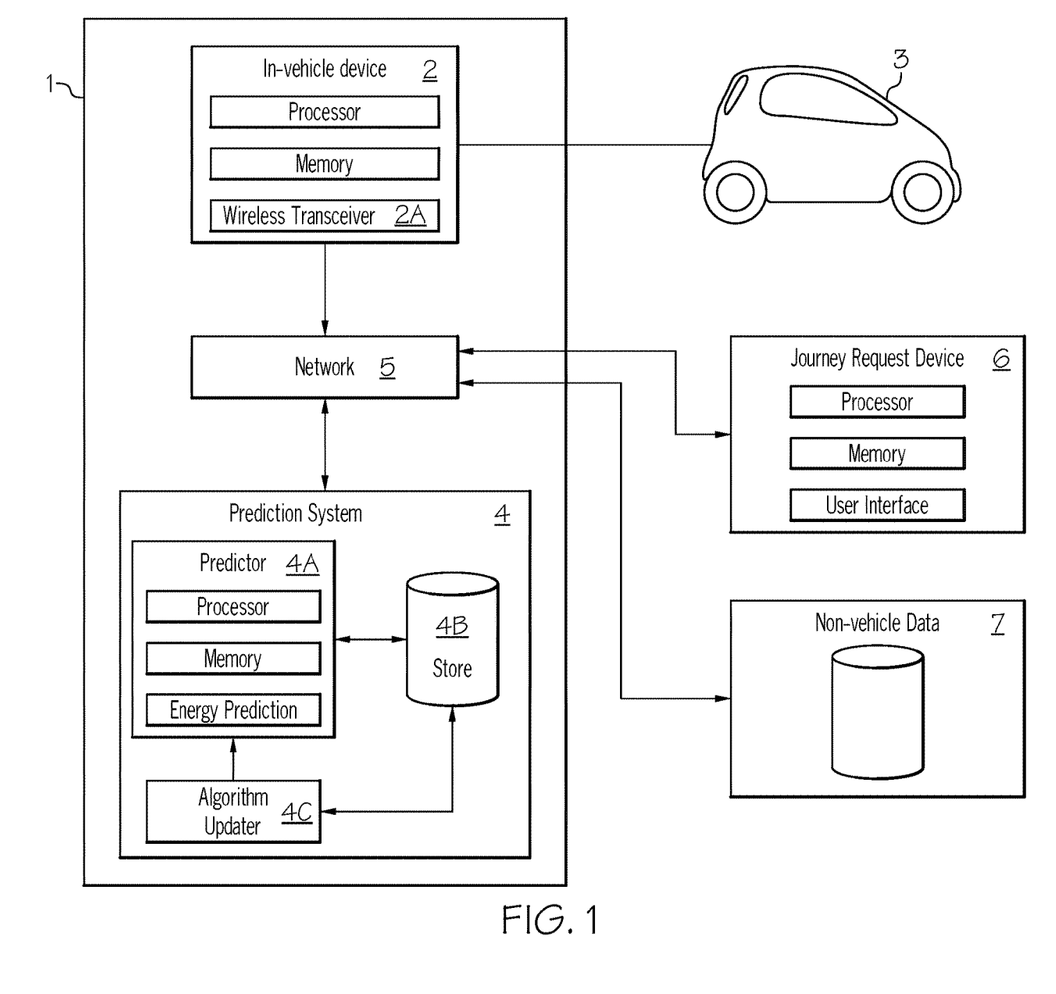
FIG. 1 is a schematic of a system for determining an energy requirement of a vehicle for a journey.

With reference to FIG. 1 there is shown a system 1 for determining an energy requirement of a vehicle for a journey. The system 1 comprises a vehicle device 2 that is located in a vehicle 3, and a prediction system 4.

The prediction system 4 comprises a predictor mechanism 4A, memory store 4B and updater mechanism 4C. A memory store may include any one or more of the following: volatile memory, non-volatile memory, computer storage system, and the like. The prediction system 4 is implemented by one or more suitably programmed processors communicatively coupled with memory stores and other computer components, using techniques known to those skilled in the art. A typical combination of hardware and software used to implement the prediction system 4 could be a general purpose computer system with a computer program that, when being loaded and executed, controls the computer system such that it carries out the methods described herein.

The vehicle device 2, which comprises one or more processors communicatively coupled with memory stores and other computer components, is arranged to receive energy on board data together with other current vehicle data including geolocation data from the vehicle 3, and to relay the current vehicle data via a wireless transmitter 2A (which could be a wireless transceiver) via a network 5 that includes a wireless receiver (not shown), to the prediction system 4.

In one arrangement the vehicle device 2 is arranged to be connected to an on-board computer of the vehicle and receive said vehicle data from the computer; however, in another arrangement the computer may itself be arranged to transmit the vehicle information and thus the vehicle device may be omitted. The functions of the device may be carried out by a mobile (cellular) phone running a suitable application; where this is so, and the mobile phone is on-board the vehicle, geolocation information of the vehicle may be derived from the mobile phone's own global navigational chip.

The system 1 is adapted to receive a request for a journey prediction from a journey request device 6, e.g. from a user (who may be in the vehicle) via a computer, satellite navigational system or a vehicle journey scheduling system such as might be used by a taxi or courier company. The request identifies the vehicle and driver combination that will carry out the journey for which the prediction is requested and includes journey information identifying the destination and any waypoints. Favourably the journey information also includes further information such as payload (e.g. number of passengers), route restrictions (e.g. avoid tolls) and speed restrictions imposed on the vehicle.

The journey prediction request is received by the prediction system 4 via the network 5. In response the predictor 4A, implementing an energy usage algorithm stored in memory store 4B, derives an energy requirement prediction using the received current variant vehicle data from the vehicle device 2, together with invariant vehicle data pertaining to the vehicle from memory store 4B and non-vehicle data pertaining to the journey from external source 7 (e.g. third party data provided) through network 5. A safety margin is applied to the calculated prediction to account for expected error in the predicted energy usage for the journey compared with the actual energy usage for the journey. The derived prediction (including safety margin) is returned via network 5 to the journey request device 6.

Where the predicted energy requirement (including safety margin) exceeds that of the energy on board the vehicle 3 as provided from vehicle device 2 (e.g. where an electric car energy on board data may be derived from state of charge data and battery health data), the predictor 4A returns an indication to the journey request device 6 that the journey is not achievable with the energy on board.

Where the request is submitted by a user it may be submitted via a computer, including portable computer such as smart phone. The request may be received from a satellite navigational system and used by the satellite navigation system to determine an appropriate route for a trip e.g. a route that is most suitable given the vehicle's state of charge.

Where the system is used in conjunction with a scheduling system 6, the scheduling system may use the system 1 to provide predictions for a set of vehicles available to carry out a journey that includes travel between at least two locations (e.g. as a request of a request for a taxi by a customer). The predictions may be used by a scheduling system to determine which vehicle of the set of vehicles would be most suitable to carry out the journey given the vehicles' different locations and states of charge.

The prediction together with the data used to create the prediction is stored in memory store 4B.

This process repeats each time a journey prediction request is made for the vehicle driver combination.

Following completion of a journey, the system determines the actual energy usage for the journey using the energy on board data from the vehicle device 2 at the start and end of the journey. The system 1 may determine that the vehicle has completed the journey though, e.g. an indicator from the user/scheduling system, and/or geolocation information received from the vehicle device 2.

Figure 2:
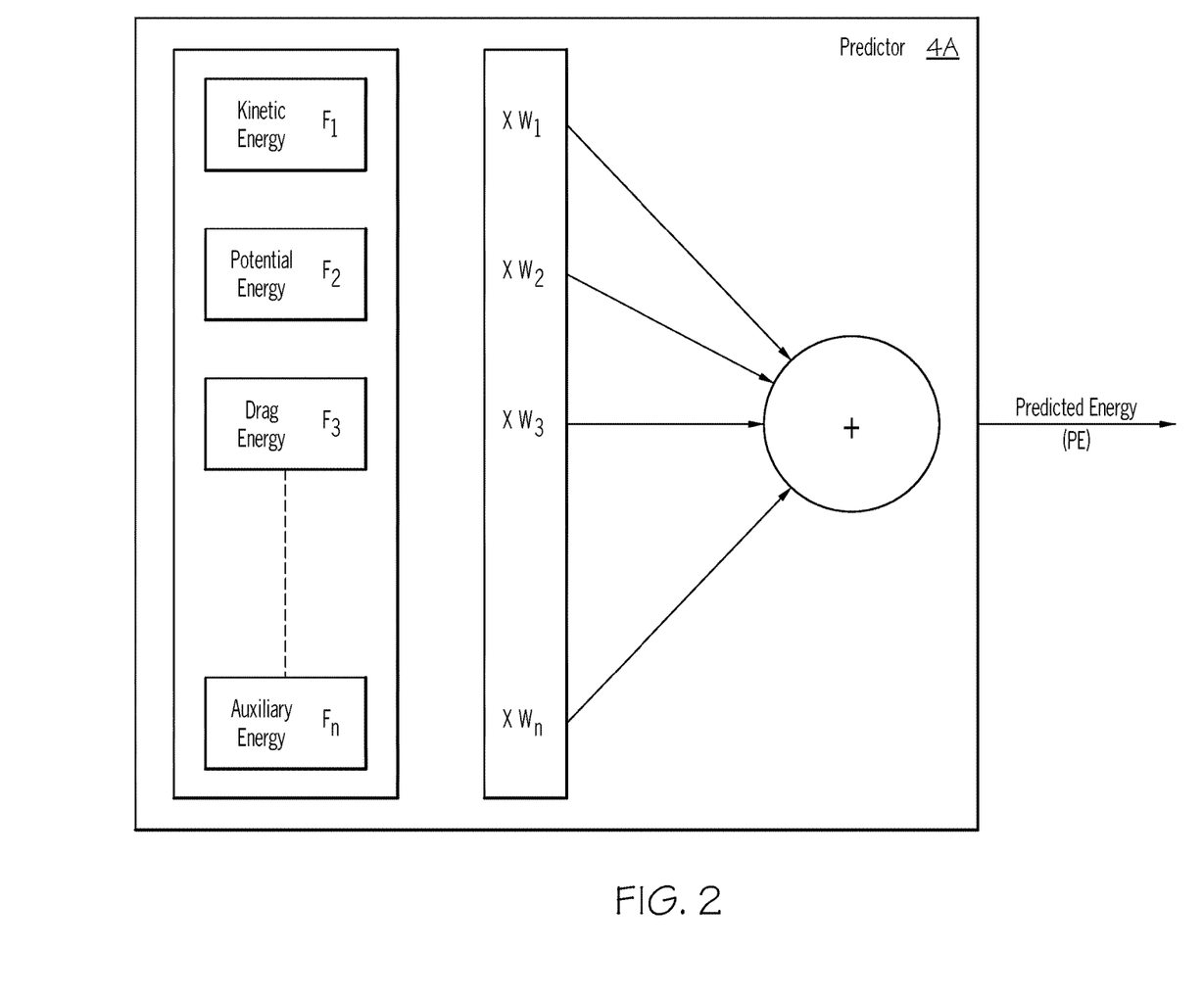
FIG. 2 is a schematic of the process for deriving an energy requirement prediction for a journey.

With reference to FIG. 2, to derive an energy usage prediction for a journey, the predictor 4A uses the vehicle data and non-vehicle data to determine predicted values for individual energy component factors $F_1$-$F_n$ that summed together (or otherwise combined) provide the predicted energy usage for the journey. A weighting $W_1$-$W_n$ is associated with each factor. The associated weighting is applied (e.g. multiplied) to each individual energy component factor F, e.g. $F_1.W_1$, $F_2.W_2$ ... $F_n.W_n$ and the weighted factors summed:

$$PE = \sum_{1}^{n} Wn.Fn$$

to provide a weighted predicted energy usage prediction (PE). For a new vehicle driver combination the weightings may be initially set so as to have neutral affect, i.e. such that the weighted prediction is the same as a non-weighted prediction. Alternatively, the weighting may be selected to reflect that of another similar vehicle for which historical journey information has already been recorded.

The system may determine the journey as including a route from a destination provided by the user/scheduling system, to a proximate refueling station. The system may also determine the journey to include a route from the vehicle's current location to a starting location as provided by the user/scheduling system.

Periodically or at some non-regular time interval, the prediction system 4 runs the algorithm updater 4C to refine the algorithm.

Figure 3:
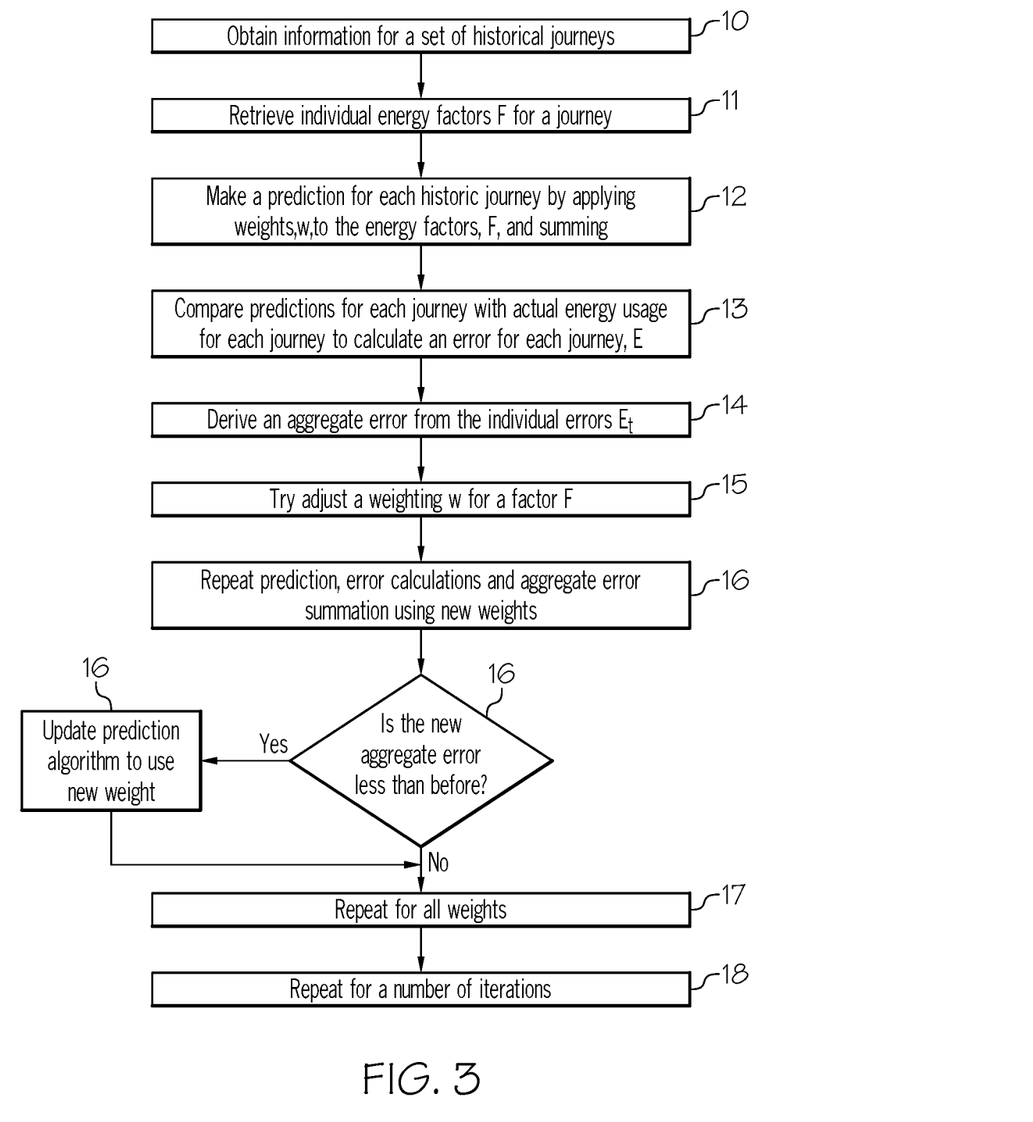
FIG. 3 is a flow chart of the process for updating the algorithm used to derive the energy requirement prediction for the journey.

With reference to FIG. 3, the updater 4C obtains information for a set of historical journeys held in memory store 4B (10), for each historical journey the updater retrieves (or derives) the values for the individual energy component factors F (11), applies a weighting W to each factor F and sums the weighted factors to derive a predicted energy usage for the historical journey (12). The predicted energy is compared with an actual energy used for the journey as held in memory store 4B to determine an error E for the journey (13). This leads to a set of errors $E_1$-$E_j$ where j is the number of journeys in the historical set. The errors $E_1$-$E_j$ are summed to provide an aggregate error $E_t$ (14).

The updater then adjusts a weighting W for a factor F (15), the same adjustment is made to the same factor of each of the historical journeys leading to a new set of errors $E_1$-$E_j$. If the adjustment results in a reduced aggregate error $E_t$, the algorithm stored in memory store 4B is updated with the new weighting W (16). This process is iterated for the weighting for each factor, e.g. $W_1$, then $W_2$ ... to $W_n$ (17).

This process is repeated until either the aggregate error $E_t$ is within a desired tolerance or to a desired number of iterations (18). The refined algorithm is stored in memory store 4B. It will be appreciated that the order that the factor weighting are altered does not have to be specific.

By varying the weighting, the algorithm is refined to account for idiosyncrasies of the particular vehicle and driver combination that affect energy consumption, e.g. the driver's driving style and changes in the vehicle's condition and as such becomes more accurate at predicting the energy requirement for future journeys.

It will be appreciated to those skilled in the art that in addition to the gradient descent approach described above, there are numerous other possible methods of optimising the algorithm to lower aggregate error $E_t$, including for example, solving a set of simultaneous equations. It will be appreciated that the exact method used is not necessarily of import.

As part of the refinement process, the updater 4C determines the safety margin that is applied to the calculated prediction PE. The size of safety margin is related to the sizes of one or more of the individual errors $E_1$-$E_j$, for the historical journeys derived from the refined algorithm. As the individual sizes of the errors $E_1$-$E_j$ reduces, the size of the safely margin used will also reduce. The size of the safety margin may be derived using standard deviation of the individual errors, by size of the largest individual error or by some other means.

In a variant embodiment, the system as a whole may be located in the vehicle making the journey and may, for example, form a part of the vehicle's satellite navigation system with the functions of the prediction system carried out by the vehicle's computer. In such an arrangement the vehicle device may be omitted. Requests for journey information may be provided by a user via an interface of the vehicle's satellite navigation system.

The system may be adapted to determine an energy requirement for a journey without live vehicle data. In this variant arrangement, the system may use the most recent vehicle data it has for the vehicle and/or values provided by a user or scheduling system.

The prediction system 4, vehicle device 2 and journey request device 6 discussed above with reference to FIG. 1 can each include various components. Some of these components that are usable by certain example implementations of the computer system will be discussed below.

The prediction system 4 may comprise at least one processor/controller communicatively coupled with persistent (non-volatile) memory 4B of the prediction system 4. A bus architecture communicatively couples the processor/controller of the prediction system 4 with the memory 4B and other components of the prediction system 4. The bus architecture facilitates communication between the various system components in the prediction system 4.

The processor/controller of the prediction system 4 is communicatively coupled with one or more network interface devices of the prediction system 4. For example, and not for limitation, a network interface device can include at least one wireless communication transceiver device (e.g., at least one wireless communication access point transceiver device). The one or more network interface devices of the prediction system 4 are communicatively coupled with one or more communication networks 5 in order to communicate with one or more of the journey request device, vehicle device and external source e.g. for third party data. The network interface device can communicate with one or more communication networks such as a local area network (LAN), a general wide area network (WAN), and/or a public network (e.g., the Internet).

The journey request device 6 may comprise at least one processor/controller of its own of its own communicatively coupled with a memory, which can include main memory and persistent (non-volatile) memory. A bus architecture communicatively couples the processor/controller with the memory and other components of the journey request device 6. The bus architecture facilitates communication between the various system components in the journey request device 6.

The processor/controller of the journey request device 6 is communicatively coupled with at least one user interface of the electronic device. The user interface comprises a user input interface and a user output interface. Examples of elements of the user input interface can include a keyboard a keypad, a mouse, a track pad, a touchpad, a touch screen, and a microphone that receives audio signals. The received audio signals, for example, can be converted to electronic digital representations of the audio signals and stored in memory, and optionally can be used with voice recognition software executed by the processor/controller to receive user input data and commands. Examples of elements of the user output interface can include a display, a speaker, one or more indicator lights, one or more transducers that generate audible indicators, and a haptic signal generator. Some examples of displays are a liquid crystal display (LCD), a plasma display, an organic light emitting diode (OLED) display, and others. A touch screen display (also referred to as a touch input screen) functions both as an output interface device and as an input interface device that can receive direct user input taking the form of "touches," "swipes," or "taps."

The processor/controller of the journey request device 6 is communicatively coupled with one or more network interface devices. For example, and not for limitation, a network interface device can include at least one wireless communication transceiver device (e.g., at least one wireless communication access point transceiver device). The one or more network interface devices are communicatively coupled with one or more communication networks 5. The network interface device can communicate with one or more communication networks 5 such as a local area network (LAN), a general wide area network (WAN), and/or a public network (e.g., the Internet).

The processor/controller of the journey request device may in one arrangement be communicatively coupled with a GPS receiver. That is, GPS data received by the GPS receiver can be used by the processor/controller of the journey request device 6 to determine a geolocation for the journey request device 6. The geolocation of the journey request device 6 may be taken as the geolocation of the vehicle.

The vehicle device 2 may comprise at least one processor/controller communicatively coupled with a memory of the vehicle device 2, which can include main memory and persistent (non-volatile) memory. A bus architecture of the vehicle device 2 communicatively couples the vehicle device's 2 processor/controller with the vehicle device's 2 memory and other components of the vehicle device 2. The bus architecture facilitates communication between the various system components in the vehicle device 2.

The processor/controller of the vehicle device 2 is communicatively coupled with one or more network interface devices of the vehicle device 2. For example, and not for limitation, a network interface device can include at least one wireless communication transceiver device (e.g., at least one wireless communication access point transceiver device). The one or more network interface devices of vehicle device 2 are communicatively coupled with one or more communication networks 5. The network interface device of vehicle device can communicate with one or more communication networks 5 such as a local area network (LAN), a general wide area network (WAN), and/or a public network (e.g., the Internet).

The processor/controller of vehicle device 2 may be communicatively coupled with a GPS receiver of the vehicle device 2. That is, GPS data received by the GPS receiver of the vehicle device 2 can be used by the processor/controller of the vehicle device 2 to determine a geolocation for the vehicle device 2 and thus the vehicle 3.

The processor/controller of the vehicle device 2 may be communicatively coupled with one or more sensor devices (or sensors) of the vehicle 3 either directly or via a computer of the vehicle. Sensors can include various types of sensor devices that provide sensor data to the processor/controller of the vehicle device 2. Examples include one or more of tire pressures, energy of board sensors, e.g. a fuel level sensor or state of charge sensor, vehicle system temperature sensors, sensors to detect the operational state of auxiliary electrical devices, e.g. internal heater of vehicle and headlamps.

One or more of the predictor system, vehicle device and journey request device may include power supply system that provides power for its operation.

The processor/controller of the journey request device 6, and processor/controller of the vehicle device 2 may communicate with the processor/controller of the prediction system 4 via the communication network 5.

In an alternative arrangement the functions of the predictor mechanism, updater, vehicle device and journey request device may be implemented by a single computer system located in the vehicle. In this arrangement the computer system may have a processor/controller coupled with persistent (non-volatile) memory, a bus architecture communicatively coupling the processor/controller with the memory and other components of the computer system, such as sensors devices, GPS receiver and user interface devices.

As will be appreciated by one of ordinary skill in the art, a system, a method, or a computer program product, may implement various embodiments of the claimed invention. Accordingly, aspects of the claimed invention may take the form of an entirely hardware embodiment, an entirely software embodiment (including firmware, resident software, micro-code, etc.) or an embodiment combining software and hardware aspects. Furthermore, aspects of the claimed invention may take the form of a computer program product embodied in one or more non-transitory computer readable medium(s) having computer readable program code embodied thereon.

Although specific embodiments of the subject matter have been disclosed, those having ordinary skill in the art will understand that changes can be made to the specific embodiments without departing from the scope of the disclosed subject matter. The scope of the disclosure is not to be restricted, therefore, to the specific embodiments, and it is intended that the appended claims cover any and all such applications, modifications, and embodiments within the scope of the present disclosure.

The invention claimed is:

1. A system for determining a prediction of an energy requirement of a vehicle for an expected vehicle journey, the system carried by the vehicle, and the system comprising:
   one or more vehicle sensors carried by the vehicle, the vehicle sensors coupled with the vehicle and sensing physical states and conditions of the vehicle or a component of the vehicle, and the vehicle sensors providing sensor data in response to the sensing by the vehicle sensors;
one or more processors communicatively coupled with the one or more vehicle sensors;
one or more memory stores, and
one or more network interface devices which are communicatively couple with one or more communication networks,
the one or more processors being configured to:
receive a request, from a journey request device, for a prediction of an energy requirement of a vehicle for an expected vehicle journey, the request including journey data relating to the expected vehicle journey;
obtain vehicle data associated with the vehicle including the sensor data from the one or more vehicle sensors; and
obtain, via the one or more network interface devices, non-vehicle data at least in part provided through the one or more communication networks and from one or more remote external information sources;
the system comprising an interface to obtain at least the journey data relating to the expected vehicle journey;
the system comprising a predictor mechanism configured to predict, using an energy prediction algorithm, a vehicle energy requirement for the expected vehicle journey from the journey data, the vehicle data, and the non-vehicle data;
the system comprising an updater mechanism configured to adjust the energy prediction algorithm for the vehicle by:
determining for each of a number of historical journeys undertaken by the vehicle, an error between an actual vehicle energy usage for the historical journey and a predicted energy usage derived using the energy prediction algorithm for the historical journey from historical journey data, historical vehicle data and historical non-vehicle data, each historical journey of the number of historical journeys being associated with a respective error of a set of errors;
determining an aggregate error from the set of errors; and
adjusting the energy prediction algorithm by an adjustment based on determination of a reduction of the aggregate error by applying the adjustment to the energy prediction algorithm used to derive the predicted energy usage for each of the historical journeys associated with the respective error of the set of errors; and
wherein for each historical journey the updater is arranged to derive the predicted energy usage using the energy prediction algorithm by:
retrieving and/or determining values for multiple factors for the historical journey, the factors being derived from one or more of:
the historical journey data associated with the historical journey, vehicle data associated with the historical journey, and non-vehicle data associated with the historical journey;
applying a weighting to each factor;
applying the weighted factors in the energy prediction algorithm to derive the predicted vehicle energy requirement for the historical journey;
in which the updater is further arranged to apply the adjustment to a weighting for one of the factors based on the determination of the reduction of the aggregate error by applying the adjustment, the adjustment being applied to the corresponding factor for each of the historical journeys; and
the predictor algorithm predicting, using the adjusted energy prediction algorithm, the prediction comprising the vehicle energy requirement for the expected vehicle journey, and the predictor mechanism returning the prediction, based on the predicted vehicle energy requirement, to a network interface device of the journey request device, wherein the journey request device comprises
a vehicle scheduling system, wherein the vehicle scheduling system determines whether the vehicle, selected from a set of vehicles, would be most suitable to carry out the expected vehicle journey, based on the prediction.

2. A system according to claim 1, wherein the system is arranged to store in a memory store, in the one or more memory stores, one or more of the:
journey data;
vehicle data;
non-vehicle data;
data derived from one or more of the journey data, vehicle data and non-vehicle data; and
the weighted factors used by the predictor mechanism to predict the vehicle energy requirement for the expected vehicle journey.

3. A system according to claim 1 adapted to retrieve energy on board data from the vehicle.

4. A system according to claim 3 wherein the system is adapted to use the energy on board data to determine the actual vehicle energy usage for the historical journey undertaken by the vehicle.

5. A system according to claim 3 wherein the system is adapted to use the energy on board data and the prediction of the vehicle energy required for the expected vehicle journey from the predictor mechanism to provide the output signal indicative of whether the expected vehicle journey is made by the vehicle with current energy on board the vehicle.

6. A system according to claim 1, wherein the system is arranged to receive energy on board data and the vehicle data from the vehicle and wirelessly transmit, via the one or more communication networks, the received energy on board data and the vehicle data to the predictor mechanism located remote to the vehicle.

7. A system according to claim 1, wherein the predictor mechanism is adapted to include a safety margin within the predicted vehicle energy requirement for the expected vehicle journey, and
in which the updater mechanism acts to adjust a size of the safety margin according to sizes of individual errors of the historical journeys.

8. A system for determining a prediction of an energy requirement of a vehicle for an expected vehicle journey, the system carried by the vehicle, and the system comprising:
one or more vehicle sensors carried by the vehicle, the vehicle sensors coupled with the vehicle and sensing physical states and conditions of the vehicle or a component of the vehicle, and the vehicle sensors providing sensor data in response to the sensing by the vehicle sensors;
one or more processors communicatively coupled with the one or more vehicle sensors;
one or more memory stores, and one or more network interface devices which are communicatively couple with one or more communication networks, the one or more processors being configured to:
- receive a request, from a journey request device, for a prediction of an energy requirement of a vehicle for an expected vehicle journey, the request including journey data relating to the expected vehicle journey;
- obtain vehicle data associated with the vehicle including the sensor data from the one or more vehicle sensors; and
- obtain, via the one or more network interface devices, non-vehicle data at least in part provided through the one or more communication networks and from one or more remote external information sources;

the system comprising an interface to obtain at least the journey data relating to the expected vehicle journey;

the system comprising a predictor mechanism configured to predict, using an energy prediction algorithm, a vehicle energy requirement for the expected vehicle journey from the journey data, the vehicle data, and the non-vehicle data;

the system comprising an updater mechanism configured to adjust the energy prediction algorithm for the vehicle by:
- determining for each of a number of historical journeys undertaken by the vehicle, an error between an actual vehicle energy usage for the historical journey and a predicted energy usage derived using the energy prediction algorithm for the historical journey from historical journey data, historical vehicle data and historical non-vehicle data, each historical journey of the number of historical journeys being associated with a respective error of a set of errors;
- determining an aggregate error from the set of errors; and
- adjusting the energy prediction algorithm by an adjustment based on determination of a reduction of the aggregate error by applying the adjustment to the energy prediction algorithm used to derive the predicted energy usage for each of the historical journeys associated with the respective error of the set of errors; and wherein for each historical journey the updater is arranged to derive the predicted energy usage using the energy prediction algorithm by:
- retrieving and/or determining values for multiple factors for the historical journey, the factors being derived from one or more of:
  - the historical journey data associated with the historical journey, vehicle data associated with the historical journey, and non-vehicle data associated with the historical journey;
- applying a weighting to each factor;
- applying the weighted factors in the energy prediction algorithm to derive the predicted vehicle energy requirement for the historical journey;

in which the updater is further arranged to apply the adjustment to a weighting for one of the factors based on the determination of a reduction of the aggregate error by applying the adjustment, the adjustment being applied to the corresponding factor for each of the historical journeys; and the predictor algorithm predicting, using the adjusted energy prediction algorithm, the prediction comprising the vehicle energy requirement for the expected vehicle journey, and the predictor mechanism returning the prediction, based on the predicted vehicle energy requirement, to a network interface device of the journey request device, wherein the journey request device comprises at least one of:
- a driver via a computer, phone, or a satellite navigation system, in the vehicle, wherein the prediction is provided in an output signal via an interface in the vehicle, communicatively coupled with the journey request device; or
- a single computer system located in the vehicle, wherein the prediction is provided in an output signal via at least one of a user interface or a network interface device, of the journey request device; and wherein the journey request device, based on the prediction and the expected vehicle journey, determines at least one of an appropriate route for a trip for the vehicle according to the expected vehicle journey or that the requested expected vehicle journey is not achievable based on the energy on board the vehicle and/or a condition associated with the expected vehicle journey.

* * * * *